United States Patent
Shin et al.

(10) Patent No.: US 9,364,780 B2
(45) Date of Patent: Jun. 14, 2016

(54) APPARATUS FOR SEPARATING GAS AND LIQUID

(71) Applicant: LG CHEM, LTD., Seoul (KR)

(72) Inventors: Dae Young Shin, Daejeon (KR); Eun Jung Joo, Daejeon (KR); Dong Kwon Lee, Daejeon (KR); Chang Hoe Heo, Daejeon (KR); Jong Ku Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/438,470

(22) PCT Filed: Jul. 18, 2014

(86) PCT No.: PCT/KR2014/006528
§ 371 (c)(1),
(2) Date: Apr. 24, 2015

(87) PCT Pub. No.: WO2015/009095
PCT Pub. Date: Jan. 22, 2015

(65) Prior Publication Data
US 2015/0283488 A1 Oct. 8, 2015

(30) Foreign Application Priority Data

Jul. 19, 2013 (KR) .......................... 10-2013-0085394
Jul. 17, 2014 (KR) .......................... 10-2014-0090325

(51) Int. Cl.
*B01D 46/18* (2006.01)
*B01D 45/16* (2006.01)
(Continued)

(52) U.S. Cl.
CPC ............ *B01D 45/16* (2013.01); *B01J 19/006* (2013.01); *B01J 19/1812* (2013.01); *B01J 19/20* (2013.01); *B01J 2219/00774* (2013.01);
(Continued)

(58) Field of Classification Search
CPC ............ B01D 45/16; B01D 3/30; B01D 3/20; B01D 3/22; B01D 45/14; B01D 45/12; B04B 5/005; B04B 2005/125; A23L 1/2217; A23L 2/64; F01M 2013/0422
USPC .................................. 55/400–409, 424–427
See application file for complete search history.

(56) References Cited

U.S. PATENT DOCUMENTS 2,218,342 A * 10/1940 Pegram .................... B01D 3/08
159/6.1
2,228,750 A * 1/1941 Brock ...................... A47L 5/22
417/363

(Continued)

FOREIGN PATENT DOCUMENTS

FR 2575677 A1 * 7/1986 ................ B04B 5/12
JP 07-39726 A 2/1995
(Continued)

*Primary Examiner* — Dung H Bui
(74) *Attorney, Agent, or Firm* — Dentons US LLP

(57) ABSTRACT

Disclosed is an apparatus for separating gas and liquid. The apparatus for separating gas and liquid includes a housing, a rotating shaft provided inside the housing, a drive unit configured to rotate the rotating shaft, a rotating cone mounted at the rotating shaft to rotate about the rotating shaft and having a diameter decreasing from an upper end to a lower end thereof, and a fixed cone formed by coupling at least two first unit members in a circumferential direction of the rotating shaft, disposed in the housing to be spaced apart from the rotating cone and having a diameter decreasing an upper end to a lower end thereof.

15 Claims, 7 Drawing Sheets

(51) Int. Cl.
*B01J 19/00* (2006.01)
*B01J 19/18* (2006.01)
*B01J 19/20* (2006.01)

(52) U.S. Cl.
CPC .. *B01J 2219/00779* (2013.01); *B01J 2219/185* (2013.01); *B01J 2219/1943* (2013.01)

(56) References Cited

U.S. PATENT DOCUMENTS

| | | | | |
|---|---|---|---|---|
| 2,314,986 A * | 3/1943 | Johnson | ................... | A47L 9/181 55/361 |
| 2,606,146 A * | 8/1952 | Luten, Jr. | ............... | B01D 1/223 159/18 |
| 2,633,930 A * | 4/1953 | Carter | ..................... | B07B 7/08 209/714 |
| 2,698,287 A * | 12/1954 | Bowden | ................... | B01D 3/30 159/11.3 |
| 2,954,330 A * | 9/1960 | Schmieding | ............. | B01D 3/30 159/6.1 |
| 3,234,716 A * | 2/1966 | Sevin | ..................... | B01D 45/14 209/710 |
| 4,108,620 A * | 8/1978 | Bohme | .................. | B01D 59/20 310/67 R |
| 4,339,398 A * | 7/1982 | Feres | ....................... | B01J 19/32 261/89 |
| 4,460,393 A * | 7/1984 | Saget | ..................... | B01D 45/14 209/714 |
| 4,995,945 A | 2/1991 | Craig | | |
| 6,536,211 B1 * | 3/2003 | Borgstrom | ............ | B01D 45/14 55/404 |
| 7,028,995 B2 | 4/2006 | Weiland et al. | | |
| 2006/0142135 A1 | 6/2006 | Hallgren et al. | | |
| 2007/0227357 A1 * | 10/2007 | McDermott | ........... | B01D 53/24 95/270 |

FOREIGN PATENT DOCUMENTS

| | | |
|---|---|---|
| JP | 2005-313100 | 11/2005 |
| JP | 2005-313100 A | 11/2005 |
| JP | 2005-534477 A | 11/2005 |
| KR | 10-2010-0021695 A | 2/2010 |
| KR | 10-2012-0114848 A | 10/2012 |

* cited by examiner

ND LIQUID

APPARATUS FOR SEPARATING GAS AND LIQUID

This application is a National Stage Entry of International Application No. PCT/KR2014/006528, filed Jul. 18, 2014, and claims the benefit of Korean Application No. 10-2013-0085394, filed on Jul. 19, 2013, and Korean Application No. 10-2014-0090325, filed Jul. 17, 2014, all of which are hereby incorporated by reference in their entirety for all purposes as if fully set forth herein.

TECHNICAL FIELD

The present invention relates to an apparatus for separating gas and liquid, and more particularly, to an apparatus for separating gas and liquid including a divisible or foldable fixed cone or a sealing member.

BACKGROUND ART

Generally, reaction apparatuses are required to prepare products through a chemical reaction. A batch-type reactor in which raw material products are added into, and then stirred in one reactor has been usually used as such reaction apparatuses. However, when the batch-type reactor is used, a large amount of non-raw material products may be generated since a sufficient reaction does not occur on reaction requiring a rapid mass transfer rate. Also, when a catalyst is used, a process of separating the catalyst is essentially required, resulting in an increase in cost with an increase in capacity.

Korean Patent No. 10-961,765 discloses a spinning disk reactor. However, the spinning disk reactor has a problem in that a raw material reactant stays in a spinning disk for a short retention time since the disk is disposed in a horizontal direction. Accordingly, a spinning cone column (SCC) capable of improving a retention time of the raw material reactant by installing a disk having a certain slope, that is, a cone, has been proposed.

In particular, in the case of the spinning cone column, rotating cones which rotate about the rotating shaft, and fixed cones (i.e., stationary cones or stators) which do not rotate are alternately installed inside one column. However, the spinning cone column has no means capable of removing scale generated in the rotating cones or fixed cones. When such scale grows into lump, the lump may be separated to disturb an operation of the apparatus.

Here, when a fluid is introduced into the uppermost rotating cone, the fluid spreads on a surface of the rotating cone in the form of a thin film by means of a centrifugal force, and moves to the fixed cone positioned below the rotating cone. Unlike the rotating cone, the fluid in the fixed cone moves downward due to the gravity while partially maintaining mobility caused by the centrifugal force provided by the rotating cone.

FIG. 1 is a perspective view of a fixed cone constituting a conventional spinning cone column.

When the fixed cone shown in FIG. 1 is used, accessibility into the spinning cone column may be degraded. Thus, it is difficult to maintain the fixed cone to prevent breakdowns from occurring in the fixed cone, and also difficult to repair the fixe cone when the breakdowns occur in the fixed cone.

Meanwhile, the fixed cone is installed with substantially no tolerance to the housing in order to prevent the fluid from flowing outward from the fixed cone. In this case, it may be very difficult to install or disassemble the fixed cone.

DISCLOSURE

Technical Problem

The present invention is directed to providing an apparatus for separating gas and liquid which is capable of easily installing and detaching a fixed cone.

Also, the present invention is directed to providing an apparatus for separating gas and liquid which is capable of preventing a reactant from flowing outward from the fixed cone.

Technical Solution

To solve the prior-art problems, one aspect of the present invention provides an apparatus for separating gas and liquid including a housing, a rotating shaft provided inside the housing, a drive unit configured to rotate the rotating shaft, a rotating cone mounted at the rotating shaft to rotate about the rotating shaft and having a diameter decreasing from an upper end to a lower end thereof, and a fixed cone formed by coupling at least two first unit members in a circumferential direction of the rotating shaft, disposed in the housing to be spaced apart from the rotating cone and having a diameter decreasing an upper end to a lower end thereof.

Here, each of the first unit members may be detachably mounted at an inner wall of the housing.

Also, the apparatus for separating gas and liquid may further include a support unit configured to protrude from the inner wall of the housing toward the rotating shaft and support the first unit members.

In addition, a protrusion extending toward the support unit may be formed at each of the first unit members, and a coupling hole into which the protrusion may be inserted may be formed at the support unit.

Additionally, the coupling hole may be formed through the support unit, and the protrusion may protrude outward from the coupling hole in a state in which the first unit member is installed in the support unit.

Further, the two adjacent first unit members may be separably coupled to each other.

Also, the fixed cone may be formed by coupling lateral ends of the two adjacent first unit members so that at least portions of the lateral ends of the two adjacent first unit members overlap.

In addition, a first stepped portion may be provided at a lateral end of one of the two adjacent first unit members, and a second stepped portion formed in a direction opposite to that of the first stepped portion may be provided at a lateral end of the other first unit member.

Additionally, a first protrusion may be formed at the first stepped portion, and a first groove portion recessed to insert the first protrusion may be formed at the second stepped portion.

Further, each of the first unit members may include a tubular main body having a diameter decreasing from an upper end to a lower end thereof, and an extension extending downward from the main body to have a predetermined diameter.

Also, the apparatus for separating gas and liquid may further include a ring-shaped sealing member inserted into the housing to contact and support the main body or the extension and having an orifice formed in a central region thereof.

In addition, the sealing member may be formed by coupling at least two second unit members in a circumferential direction of the rotating shaft.

Additionally, the two adjacent second unit members may be hinged to each other.

Another aspect of the present invention provides an apparatus for separating gas and liquid including a housing, a rotating shaft provided inside the housing, a drive unit configured to rotate the rotating shaft, a rotating cone mounted at the rotating shaft to rotate about the rotating shaft and having a diameter decreasing from an upper end to a lower end thereof, a fixed cone disposed spaced apart from the rotating cone, and including a main body formed to have a diameter decreasing from an upper end to a lower end thereof and an extension extending downward from the main body, and a sealing member inserted into the housing to support the fixed cone and having a larger diameter than the maximum diameter of the fixed cone.

Here, the sealing member may be a ring-shaped washer having an orifice formed in a central region thereof.

Also, the washer may have a larger outer diameter than the maximum diameter of the fixed cone.

In addition, the sealing member may be formed by coupling at least two second unit members in a circumferential direction of the rotating shaft.

Further, the sealing member may be formed by coupling lateral ends of the two adjacent second unit members so that at least portions of the lateral ends of the two adjacent second unit members overlap.

Also, a third stepped portion may be provided at a lateral end of one of the two adjacent second unit members, and a fourth stepped portion formed in a direction opposite to that of the third stepped portion is provided at a lateral end of the other first unit member.

In addition, a second protrusion may be formed at the third stepped portion, and a second groove portion recessed to insert the second protrusion may be formed at the fourth stepped portion.

Further, the two adjacent second unit members may be hinged to each other.

Advantageous Effects

As described above, the apparatus for separating gas and liquid according to at least one exemplary embodiment of the present invention has the following effects.

The fixed cone may be easily installed and disassembled by dividing the fixed cone into a plurality of unit members and coupling the plurality of unit members.

Also, even when there is a tolerance between the fixed cone and the housing, a reactant may be prevented from flowing outward from the fixed cone by installing a sealing member having a larger diameter than the fixed cone. Also, the fixed cone may be easily installed and detached since the fixed cone may be formed so that the fixed cone has a smaller maximum diameter than an inner diameter of the housing.

Further, it is easy to install, maintain and repair the apparatus for separating gas and liquid.

BEST MODE

Figure 1:
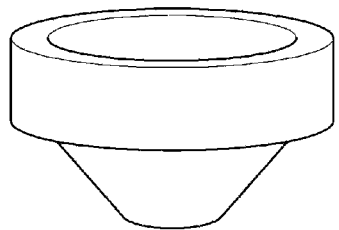
FIG. 1 is a perspective view of a fixed cone constituting a conventional spinning cone column.

Hereinafter, apparatuses for separating gas and liquid according to various exemplary embodiments of the present invention will be described in detail with reference to the accompanying drawings.

Also, regardless of the reference numerals in the drawings, like or corresponding elements have the same or similar reference numerals, and a description thereof is omitted for clarity. In this case, the shapes and dimensions of elements shown in the drawings may be exaggerated or diminished for the sake of convenience of description.

Figure 2:
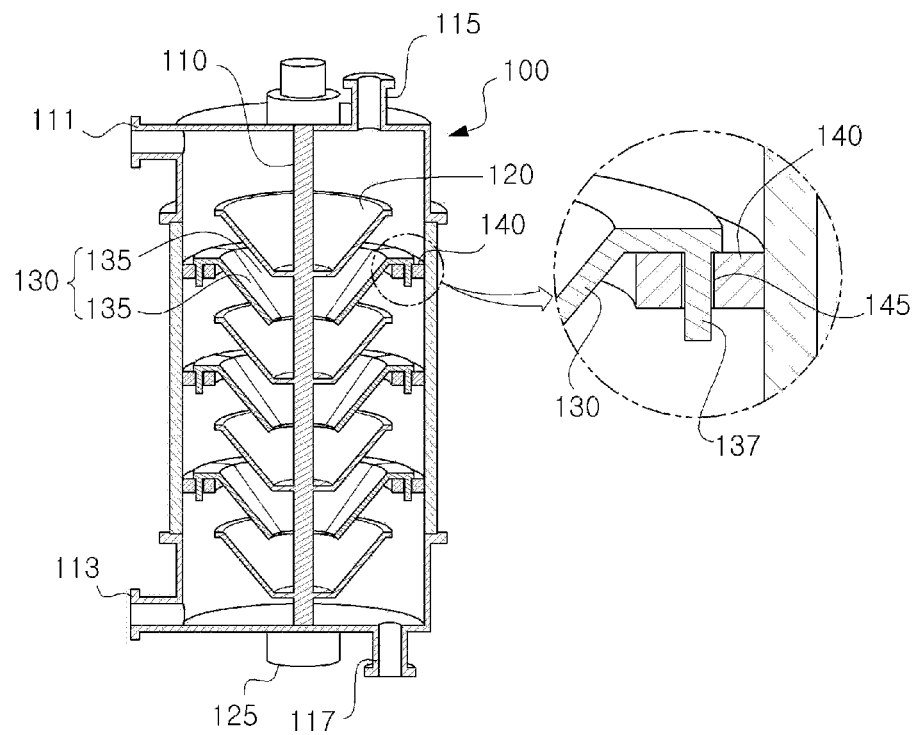
FIG. 2 is a cross-sectional view of an apparatus for separating gas and liquid according to a first exemplary embodiment of the present invention.
Figure 3:
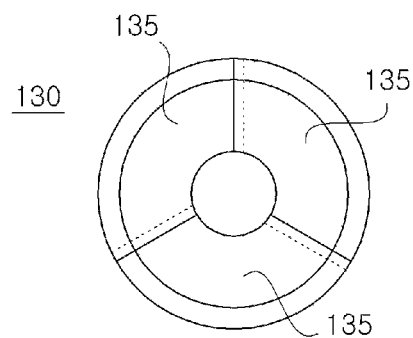
FIG. 3 is a plane view of a fixed cone shown in FIG. 2.
Figure 4:
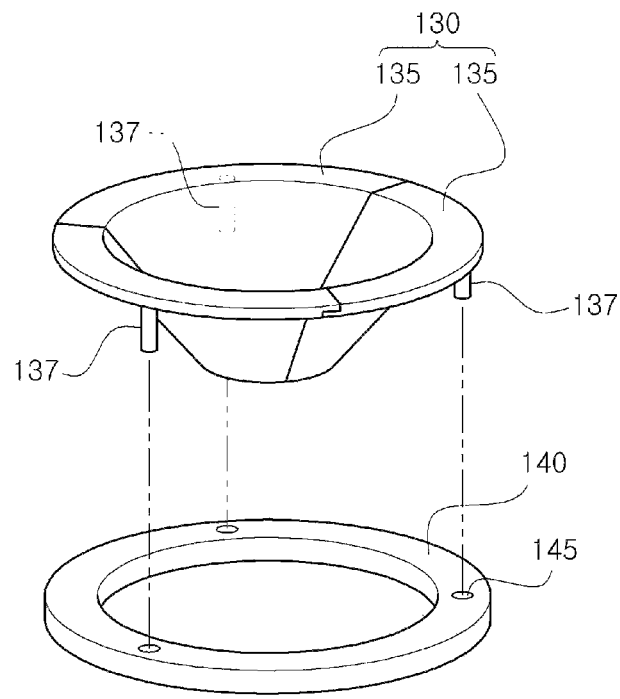
FIG. 4 is a perspective view of a fixed cone and a support unit shown in FIG. 2.
Figure 5:
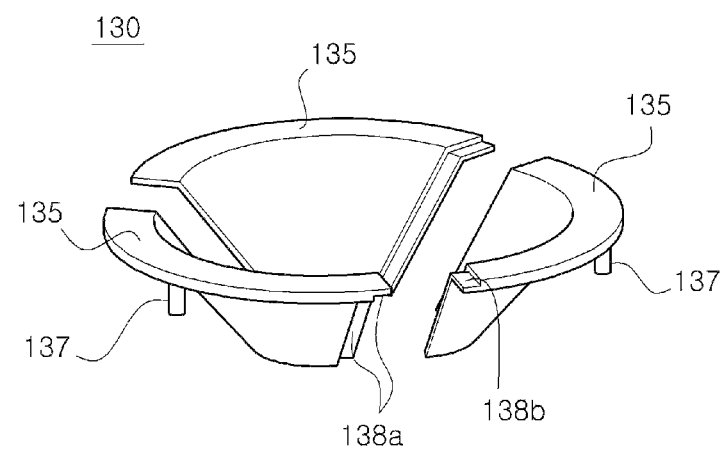
FIG. 5 is an exploded perspective view of the fixed cone shown in FIG. 2.

FIG. 2 is a cross-sectional view of an apparatus for separating gas and liquid according to a first exemplary embodiment of the present invention, FIG. 3 is a plane view of a fixed cone shown in FIG. 2, FIG. 4 is a perspective view of a fixed cone and a support unit shown in FIG. 2, and FIG. 5 is an exploded perspective view of the fixed cone shown in FIG. 2.

Referring to FIGS. 2 to 5, the apparatus for separating gas and liquid according to first exemplary embodiment includes a housing 100, a rotating shaft 110 provided inside the housing 100, and a drive unit 125 configured to rotate the rotating shaft 110.

Also, the apparatus for separating gas and liquid includes a rotating cone 120 mounted at the rotating shaft 110 to rotate about the rotating shaft 110 and having a diameter decreasing from an upper end to a lower end thereof, and a fixed cone 130 fixed in the housing 100 to be spaced apart from the rotating cone 120 and having a diameter decreasing from an upper end to a lower end thereof.

The housing 100 may be formed as a hollow cylinder (a tubular cylinder) having a space formed therein for accommodating the rotating shaft 110, the rotating cone 120 and the fixed cone 130. Also, the housing 100 may be a column extending in a height direction. According to one exemplary embodiment, the housing 100 may be formed of stainless steel, but the material of the housing is not necessarily limited thereto.

Also, the housing 100 may include a first supply unit 111 configured to supply a reactant into the housing 100, and a second supply unit 113 configured to supply a gas into the housing 100.

Here, since the reactant moves downward (to a lower end portion of the housing 100 in a height direction) due to the gravity, the first supply unit 111 used to supply the reactant may be provided in an upper end portion (an upper end portion in a height direction) of the housing 100. In this case, the two or more first supply unit 111 may be provided to supply two or more reactants.

Also, since the gas reacts with the reactant while moving in an upper direction opposite to that of the reactant (toward an upper end portion of the housing 100 in a height direction), the second supply unit 113 used to supply a gas may be provided in a lower end portion of the housing 100.

Meanwhile, the housing 100 may include an outlet unit 115 used to discharge a residual gas from the housing 100, and a collection unit 117 used to collect a product from the housing 100.

Here, the residual gas is a gas obtaining after reacting with the reactant while moving toward the upper side of the housing 100. Therefore, the outlet unit 115 used to discharge the residual gas may be provided in an upper end portion of the housing 100. Also, the product is generated by reacting with the gas or being subjected to gas treatment as the reactant moves to a lower portion of the housing 100. Therefore, the collection unit 117 used to collect the product may be provided in a lower end portion of the housing 100.

Specifically, the first supply unit 111 and the outlet unit 115 may be provided in the upper end portion of the housing 100, and the second supply unit 113 and the collection unit 117 may be provided in the lower end portion of the housing 100.

However, the positions of the first supply unit 111, the second supply unit 113, the outlet unit 115, and the collection unit 117 are given by way of illustration only, but the present invention is not necessarily limited thereto.

The rotating shaft 110 serves to rotate the rotating cone 120, and is formed inside the housing 100 in a height direction (for example, a vertical direction) of the housing 100.

Here, the rotating shaft 110 is coupled to the drive unit 125 such as a motor, and the drive unit 125 serves to rotate the rotating shaft 110.

Meanwhile, the rotating cone 120 is mounted at the rotating shaft 110 to rotate about the rotating shaft 110. Also, the rotating cone 120 may have a diameter decreasing from an upper end to a lower end thereof, based on the height direction of the housing 100. Specifically, the rotating cone 120 may be formed in a tubular shape in which the rotating cone 120 has a diameter decreasing from the upper end to the lower end thereof.

The rotating cones 120 and the fixed cones 130 may be alternately positioned in a height direction of the rotating shaft 110. Also, the plurality of rotating cones 120 may be mounted at the rotating shaft 110 at predetermined intervals. Further, the plurality of fixed cones 130 may be fixed in the housing 100 at predetermined intervals.

Meanwhile, any one of the rotating cones 120 may be disposed at the uppermost position in a height direction of the housing 100. Specifically, the rotating cone 120 may be mounted at the uppermost position in a height direction of the rotating shaft 110, and the fixed cones 130 and the rotating cones 120 may be alternately mounted below the uppermost rotating cone 120.

In such a configuration, a reactant flowing through the first supply unit 111 is transferred to the rotating cone 120 disposed at the uppermost position. Also, the reactant supplied into the housing 100 moves in an upper end direction of the rotating cone 120 by means of a centrifugal force generated while the rotating cone 120 is rotated, and then is separated from the rotating cone 120, and transferred to the fixed cone 130.

Also, the rotating cone 120 has a lower end portion mounted at the rotating shaft 110. Therefore, when the rotating shaft 110 rotates by means of the drive unit 125, the rotating cone 120 may rotate about the rotating shaft 110. Also, the rotating cone 120 may be formed in a tubular shape in which the rotating cone 120 has a diameter decreasing from the upper end to the lower end thereof. According to one exemplary embodiment, the rotating cone 120 may be generally formed in a "V" shape, as viewed from a vertical section thereof.

Meanwhile, the fixed cone 130 is fixed in the housing 100, and is disposed in the housing 100 to be spaced apart from the rotating cone. Also, the fixed cone 130 is formed in a tubular shape in which the fixed cone 130 has a diameter decreasing from the upper end to the lower end thereof. According to one exemplary embodiment, the fixed cone 130 may be generally formed in a "V" shape, as viewed from a vertical section thereof. In this case, the fixed cone 130 is spaced apart from the rotating cone 120, and is formed in a shape surrounding the outer circumference of the rotating cone 120. Therefore, the fixed cone 130 may receive the reactant from the rotating cone 120.

Also, since a hole passed through the rotating shaft 110 is formed at a lower end of the fixed cone 130, the reactant may be transferred from a lower end of the fixed cone 130 to the rotating cone 120 disposed below the fixed cone 130.

Meanwhile, the fixed cone 130 may be formed by coupling at least two first unit members 135. Also, the at least two first unit members 135 may be coupled in a circumferential direction of the rotating shaft 110.

Referring to FIG. 3, the first unit members 135 may be in a shape in which the fixed cones 130 are divided into the number of n (where n is an integer greater than or equal to 2) in a circumferential direction of the rotating shaft 110. Therefore, the fixed cone 130 may be easily installed at the housing 100 by inserting the first unit members 135 one by one and coupling the two adjacent first unit members 135. Also, the fixed cone 130 may be detached from the housing 100 by detaching the two adjacent first unit members 135 and extracting the first unit members 135 outward from the housing 100.

Also, the fixed cone 130 may be detachably mounted on an inner wall of the housing 100. Each of the first unit members 135 may also be detachably mounted on the inner wall of the housing 100. In addition, the two adjacent first unit members 135 may be separably coupled to each other.

Referring to FIGS. 4 and 5, the fixed cone 130 may be formed by coupling lateral ends of the two adjacent first unit members 135 so that at least portions of the lateral ends of the two adjacent first unit members 135 overlap.

Figure 6:
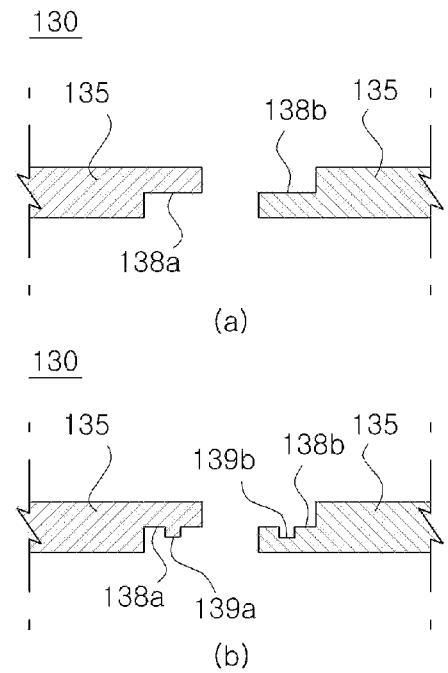
FIG. 6 is a cross-sectional view showing a coupling relation between first unit members shown in FIG. 2.

Meanwhile, referring to FIG. 6, a first stepped portion 138a may be provided at a lateral end of one of the two adjacent first unit members 135, and a second stepped portion 138b firmed in a direction opposite to that of the first stepped portion 138a may be provided at a lateral end of the other first unit member 135. That is, the first stepped portion 138a and the second stepped portion 138b, both of which have the corresponding shapes, may be formed at the lateral ends of the two adjacent first unit members 135, respectively.

Here, the fixed cone 130 may be formed using at least two first unit members 135 by coupling the first stepped portion 138a and the second stepped portion 138b to each other.

Referring to FIG. 6B, a first protrusion 139a may be formed at the first stepped portion 138a, and a first groove portion 139b recessed to insert the first protrusion 139a may be formed at the second stepped portion 138b. Therefore, when the first stepped portion 138a and the second stepped portion 138b are coupled to each other, the first protrusion 139a is inserted into the first groove portion 139b.

As described above, the first stepped portion 138a, the second stepped portion 138b, the first protrusion 139a, and the first groove portion 139b may be formed at both lateral ends of the first unit members 135 to increase a coupling area between the two adjacent first unit members 135. Therefore, it is possible to enhance a coupling strength between the adjacent second unit members 155, and also to prevent a fluid from flowing out between the adjacent second unit members 155. However, forming the first stepped portion 138a, the second stepped portion 138b, the first protrusion 139a, and the first groove portion 139b on the first unit members 135 is given by way of illustration only, but is not intended to limit the scope of the present invention. For example, the two adjacent first unit members 135 may be coupled to each other using all kinds of methods known in the related art.

Referring to FIG. 2, the apparatus for separating gas and liquid may further include a support unit 140 configured to protrude from an inner wall of the housing 100 toward the rotating shaft 110 and support the first unit members 135. The support unit 140 may support the plurality of first unit members 135. The support unit 140 serves to easily install or disassemble the fixed cone 130 and stably support the fixed cone 130.

Specifically, the support unit 140 protrudes from the inner wall of the housing 100 toward the rotating shaft 110. Also, the support unit 140 may have a ring shape provided with an orifice through which a portion of the fixed cone 130 passes. In this case, the support unit 140 may be formed integrally with the housing 100, and may be formed separately from the housing 100.

When the fixed cone 130 is installed, an upper end of the fixed cone 130 may be supported by the support unit 140. Also, the fixed cone 130 may be detached from the housing 100 by detaching the fixed cone 130 from the support unit 140.

Referring to FIGS. 2 and 4, a protrusion 137 extending toward the support unit 140 may be formed at each of the first unit members 135, and a coupling hole 145 through which the protrusion 137 is inserted may be formed at the support unit 140. The protrusion 137 may protrude downward from the upper end of the fixed cone 130. The coupling hole 145 may be formed so that the coupling hole 145 is passed through the support unit 140 in a vertical direction.

In this case, the protrusion 137 may protrude outward from the coupling hole 145 in a state in which the first unit members 135 are anchored in the support unit 140. Therefore, the protrusion 137 of the fixed cone 130 may be inserted into the coupling hole 145 of the support unit 140, and thus the fixed cone 130 may be stably coupled to the support unit 140.

To ensure structural stability, at least one protrusion 137 may be formed at each of the first unit members 135 constituting the fixed cone 130. Referring to FIG. 4, the number of such protrusions 137 and the corresponding number of the coupling holes 145 may be provided in the support unit 140.

Meanwhile, a gap may appear between the fixed cone 130 and the inner wall of the housing 100 due to the tolerance. In this case, however, a fluid (for example, a reactant) may be prevented from passing through the gap using the above-described support unit 140. Therefore, a gap between the fixed cone 130 and the housing 100 may be provided to easily perform a process of installing or disassembling the fixed cone 130 inside the housing 100.

However, the fixed cone 130 should not be necessarily supported by the support unit 140. For example, referring to FIG. 7, the fixed cone 130 may be directly coupled to the inner wall of the housing 100. That is, each of the first unit members 135 constituting the fixed cone 130 may be directly coupled to the inner wall of the housing 100. In this case, of course, the respective first unit members 135 may be separably coupled to the inner wall of the housing 100.

Figure 7:
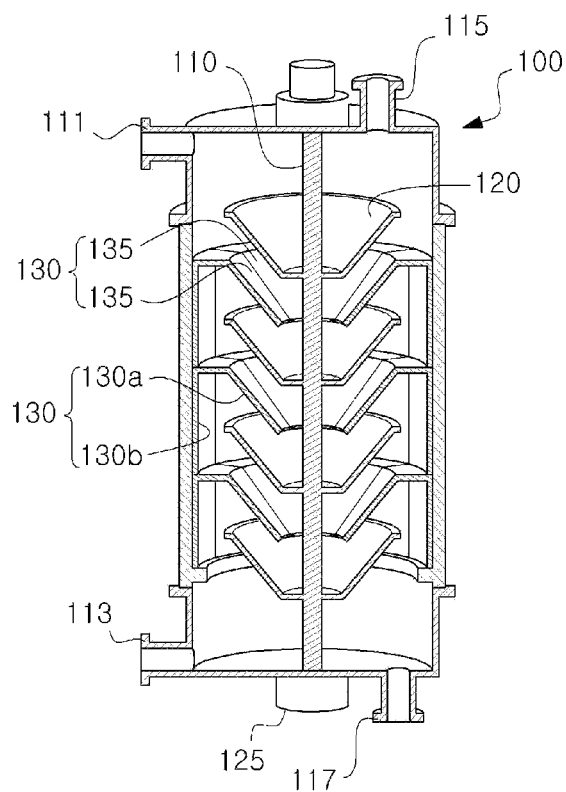
FIG. 7 is a cross-sectional view showing a modified embodiment of the apparatus for separating gas and liquid according to the first exemplary embodiment of the present invention.

Referring to FIG. 7, the fixed cone 130 may include a main body 130a formed in a tubular shape in which the main body 130a has a diameter decreasing from an upper end to a lower end thereof, and an extension 130b extending downward from the main body 130a to have a predetermined diameter. Also, each of the first unit members 135 may include the main body 130a and the extension 130b. In addition, the extension 130b may extend downward from an upper end of the main body 130a. Therefore, a lower end of the extension 130b of the fixed cone 130 disposed at a relatively upper position may be supported by the upper end of the main body 130a of the fixed cone 130 disposed at a relatively lower position. Thus, the plurality of fixed cones 130 may be stacked at proper intervals.

Meanwhile, the apparatus for separating gas and liquid may further include a ring-shaped sealing member 150 inserted into the housing 100 to contact and support the main body 130a or the extension 130b and having an orifice formed in a central region thereof. The sealing member 150 will be described in further detail with reference to another exemplary embodiment.

Hereinafter, the apparatus for separating gas and liquid according to the second exemplary embodiment will be described in further detail referring to the accompanying drawings.

Figure 8:
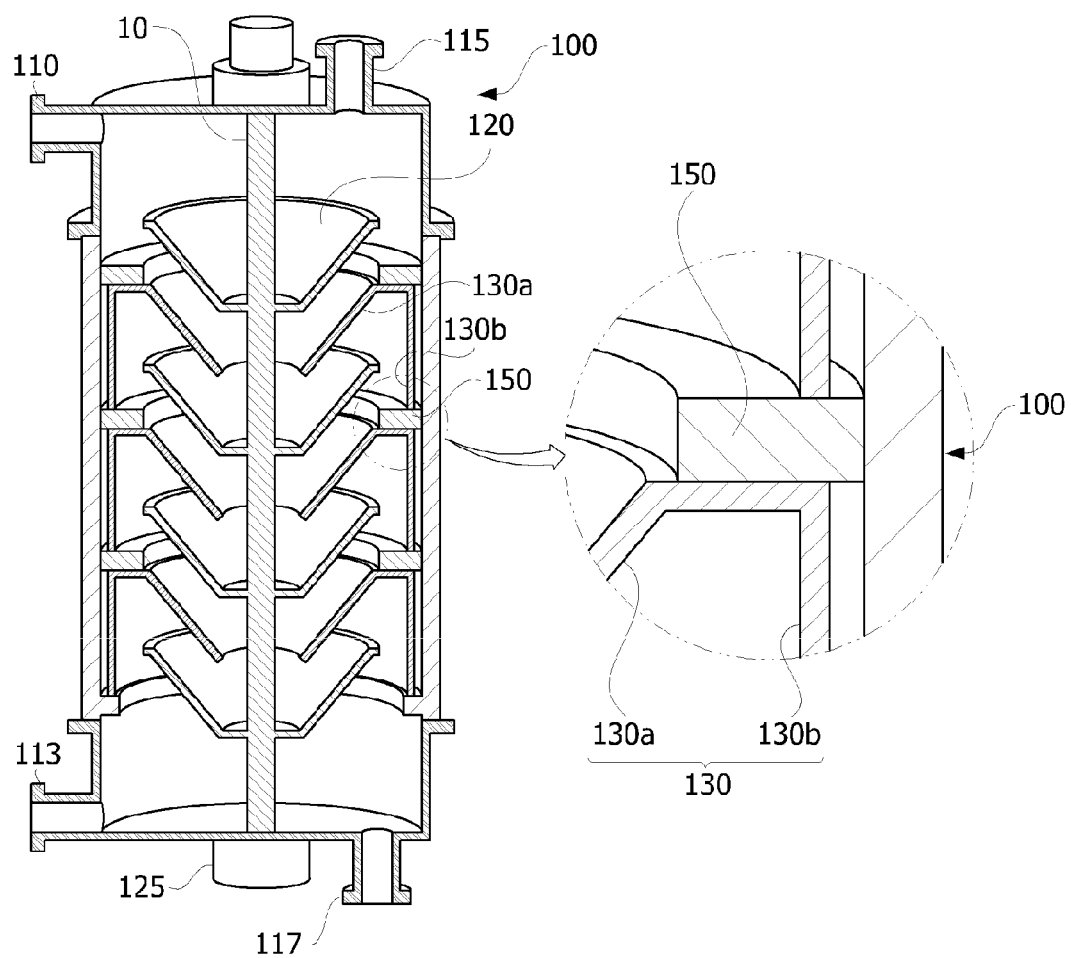
FIG. 8 is a cross-sectional view of an apparatus for separating gas and liquid according to a second exemplary embodiment of the present invention.
Figure 9:
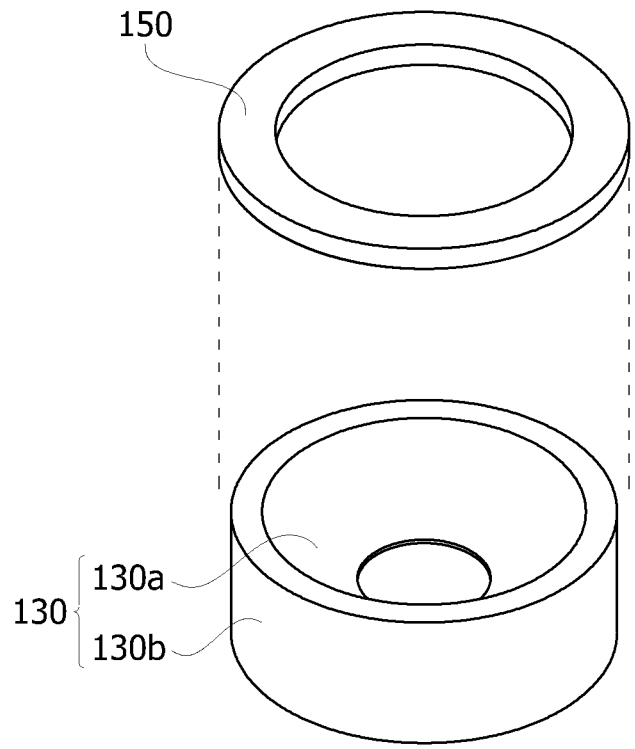
FIG. 9 is a perspective view of a fixed cone and a sealing member shown in FIG. 8.
Figure 10:
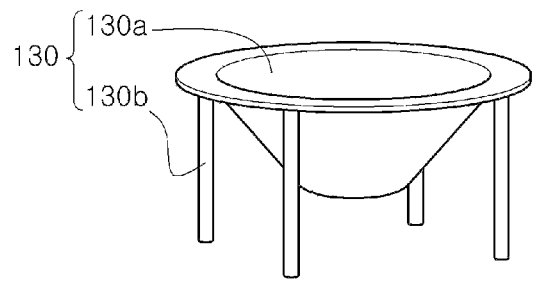
FIG. 10 is a perspective view showing a modified embodiment of the fixed cone shown in FIG. 8.
Figure 11:
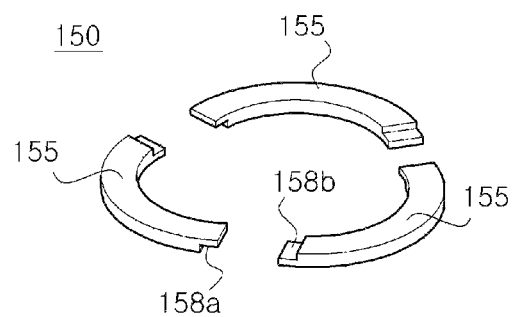
FIG. 11 is an exploded perspective view of the sealing member shown in FIG. 8.

FIG. 8 is a cross-sectional view of an apparatus for separating gas and liquid according to a second exemplary embodiment of the present invention, FIG. 9 is a perspective view of a fixed cone and a sealing member shown in FIG. 8, FIG. 10 is a perspective view showing a modified embodiment of the fixed cone shown in FIG. 8, and FIG. 11 is an exploded perspective view of the sealing member shown in FIG. 8.

Referring to FIGS. 8 to 11, the apparatus for separating gas and liquid according to the second exemplary embodiment further include the above-described sealing member 150, compared to the above-described apparatus for separating gas and liquid according to the first exemplary embodiment. Therefore, the apparatus for separating gas and liquid according to the second exemplary embodiment will be mainly described with respect to the sealing member 150, and thus a description of the apparatus for separating gas and liquid according to the second exemplary embodiment which is related to the same configuration as the apparatus for separating gas and liquid according to the first exemplary embodiment will be omitted for clarity.

Meanwhile, the fixed cone 130 may include a main body 130a formed in a tubular shape in which the main body 130a has a diameter decreasing from an upper end to a lower end thereof, and an extension 130b extending downward from an upper end of the main body 130a.

In the apparatus for separating gas and liquid according to the second exemplary embodiment, the sealing member 150 is inserted into the housing 100 to support the fixed cone 130, and has a larger diameter than the maximum diameter of the fixed cone 130. Also, the sealing member 150 may be a ring-shaped washer having an orifice formed in a central region thereof. In this case, the washer may have a larger outer diameter than the maximum diameter of the fixed cone.

Also, the reactant may be transferred from the rotating cone 120 to the fixed cone 130 via the orifice of the sealing member 150.

In addition, the sealing member 150 serves to support the fixed cone 130. Specifically, the fixed cones 130 and the sealing members 150 may be alternately installed on the inner wall of the housing 100 in a direction spanning from a lower end to an upper end of the housing 100. In this case, the sealing member 150 may contact and support the main body 130a or the extension 130b.

Specifically, the sealing member 150 may support an upper end of the main body 130a and a lower end of the extension 130b. Referring to FIG. 9, the shape of the extension 130b of the fixed cone 130 supported by the sealing member 150 may be a tubular shape having a predetermined diameter. Referring to FIG. 10, the extension 130b may also be in a bar shape. When the extension 130b is in a bar shape, the plurality of extensions 130b may be provided in a circumferential direction of the main body 130a.

Meanwhile, an outer circumferential surface of the sealing member 150 may come in contact with the inner wall of the housing 100 to prevent a fluid from flowing along the outer circumferential surface of the sealing member 150. For this purpose, the sealing member 150 may have substantially the same diameter (or outer diameter) as the inner wall of the housing 100.

In this case, even when a gap is present between the fixed cone 130 and the housing 100, the sealing member 150 may be used to prevent the fluid from flowing through the gap. Therefore, when the gap is present between the fixed cone 130 and the housing 100, a process of installing and disassembling the fixed cone 130 inside the housing 100 may be easily performed. Also, since the fixed cone 130 is supported by the sealing member 150, a welding process performed to fix the fixed cone 130 may be omitted for clarity. In addition, since the sealing member 150 shows high heat conductivity, and thus may enhance the efficiency of the apparatus for separating gas and liquid.

Referring to FIG. 9, the sealing member 150 may be formed integrally. On the other hand, referring to FIG. 11, the sealing member 150 may be formed by coupling at least two second unit members 155 in a circumferential direction of the rotating shaft 110.

Specifically, the second unit members 155 may be in a shape in which the sealing member 150 is divided into the number of n (where n is an integer greater than or equal to 2). Also, the two adjacent second unit members 155 may be separably coupled to each other.

Therefore, the sealing member 150 may be easily installed in or disassembled from the housing 100 while inserting or separating the second unit members 155 one by one.

Also, the sealing member 150 may be formed by coupling lateral ends of the two adjacent second unit members 155 so that at least portions of the lateral ends of the two adjacent second unit members 155 overlap.

Figure 12:
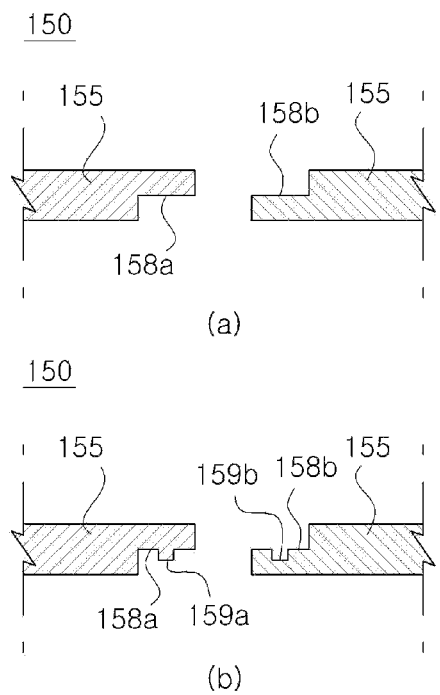
FIG. 12 is a cross-sectional view showing a coupling relation between second unit members shown in FIG. 8.

Referring to FIGS. 11 and 12, a third stepped portion 158a may be provided at a lateral end of one of the two adjacent second unit members 155, and a fourth stepped portion 158b formed in a direction opposite to that of the third stepped portion 158a may be provided at a lateral end of the other second unit member 155.

The third stepped portion 158a and the fourth stepped portion 158b, both of which have the corresponding shapes, may be formed at lateral ends of the adjacent second unit members 155, respectively. Therefore, the sealing member 150 may be formed by coupling the third stepped portion 158a and the fourth stepped portion 158b, followed by assembling the two or more second unit members 155.

Referring to FIG. 12, a second protrusion 159a may be formed at the third stepped portion 158a, and a second groove portion 159b recessed to insert the second protrusion 159a may be formed at the fourth stepped portion 158b. Therefore, when the third stepped portion 158a and the fourth stepped portion 158b are coupled to each other, the second protrusion 159a is inserted into the second groove portion 159b.

As described above, the third stepped portion 158a, the fourth stepped portion 158b, the second protrusion 159a, and the second groove portion 159b may be formed at the second unit members 155 to increase a coupling area between the adjacent second unit members 155. Therefore, it is possible to enhance a coupling strength between the adjacent second unit members 155, and also to prevent a fluid from flowing out between the adjacent second unit members 155.

However, forming the third stepped portion 158a, the fourth stepped portion 158b, the second protrusion 159a and the second groove portion 159b on the second unit members 155 is given by way of illustration only, but is not intended to limit the scope of the present invention. For example, the adjacent second unit members 155 may be coupled to each other using all kinds of methods known in the related art.

Figure 13:
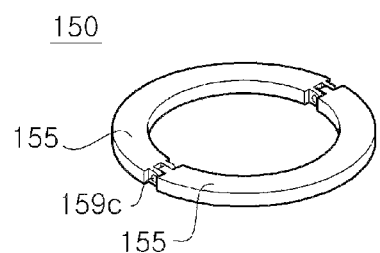
FIG. 13 is a perspective view showing a modified embodiment of the sealing member shown in FIG. 11.

Meanwhile, referring to FIG. 13, the two adjacent second unit members 155 may be coupled by means of a hinge 159c. Such a hinge 159c may guide an operation of folding the sealing member 150 toward the center axis. Accordingly, the sealing member 150 may be folded and unfolded based on the hinge 159c.

Figure 14:
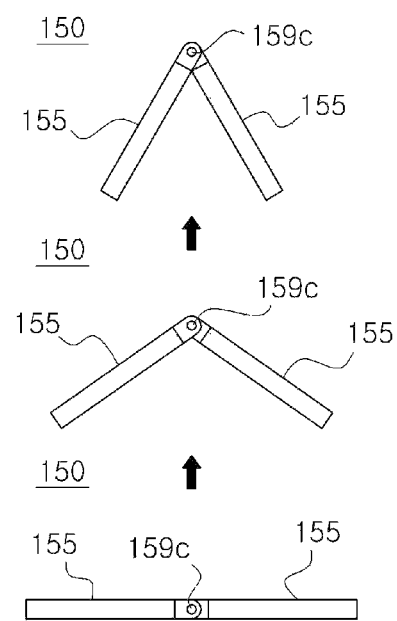
FIG. 14 is a side view showing a process of operating the sealing member shown in FIG. 13.

Referring to FIG. 14, when the sealing member 150 moves upwards, the sealing member 150 may be folded based on the hinge 159c due to the gravity, thereby reducing the volume of the sealing member 150. Therefore, the sealing member 150 may be easily disassembled from the housing 100.

Similarly, when the sealing member 150 is folded based on the hinge 159c to reduce the volume, the sealing member 150 may be easily inserted into the housing 100. Therefore, the sealing member 150 may be easily inserted into and installed inside the housing 100.

As described above, the apparatus for separating gas and liquids 100 and 200 according to the exemplary embodiments of the present invention may be gas/liquid reactors configured to remove volatile organic compounds from the reactant by reaction between the reactant and the gas.

However, the reactant should not chemically react with the gas. For example, the apparatus for separating gas and liquids 100 and 200 according to the exemplary embodiments of the present invention may be used to separate a material through the contact with the gas. Specifically, the apparatus for separating gas and liquids 100 and 200 according to the exemplary embodiments of the present invention may be used to separate a material (for example, a volatile substance, etc.) included in a liquid-phase mixture by bringing the liquid-phase mixture into contact with a gas (especially a high-temperature gas).

However, the mixture is not particularly limited as long as it is a binary component mixture in which a gas-phase material is dissolved in a liquid-phase material. For example, the mixture may be a ternary component mixture further including a solid-phase material. That is, the apparatus for separating gas and liquids 100 and 200 according to the exemplary embodiments of the present invention may be used to separate the ternary component material as well as the binary component material.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. An apparatus for separating gas and liquid comprising: a housing; a rotating shaft provided inside the housing; a drive unit configured to rotate the rotating shaft; a rotating cone mounted at the rotating shaft to rotate about the rotating shaft and having a diameter decreasing from an upper end to a lower end thereof; and a fixed cone formed by coupling at least two first unit members in a circumferential direction of the rotating shaft, disposed in the housing to be spaced apart from the rotating cone and having a diameter decreasing an upper end to a lower end thereof, wherein the two adjacent first unit members are separably coupled to each other, wherein the fixed cone is formed by coupling lateral ends of the two adjacent first unit members so that at least portions of the lateral ends of the two adjacent first unit members overlap, wherein a first stepped portion is provided at a lateral end of one of the two adjacent first unit members, and a second stepped portion formed in a direction opposite to that of the first stepped portion is provided at a lateral end of the other first unit member, and wherein a first protrusion is formed at the first stepped portion, and a first groove portion recessed to insert the first protrusion is formed at the second stepped portion.

2. The apparatus for separating gas and liquid of claim 1, wherein each of the first unit members is detachably mounted at an inner wall of the housing.

3. The apparatus for separating gas and liquid of claim 1, further comprising:
   a support unit configured to protrude from the inner wall of the housing toward the rotating shaft and support the first unit members.

4. The apparatus for separating gas and liquid of claim 3, wherein a protrusion extending toward the support unit is formed at each of the first unit members, and
   a coupling hole into which the protrusion is inserted is formed at the support unit.

5. The apparatus for separating gas and liquid of claim 4, wherein the coupling hole is formed through the support unit, and
   the protrusion protrudes outward from the coupling hole in a state in which the first unit member is installed in the support unit.

6. The apparatus for separating gas and liquid of claim 1, wherein each of the first unit members comprises:
   a tubular main body having a diameter decreasing from an upper end to a lower end thereof; and
   an extension extending downward from the main body to have a predetermined diameter.

7. The apparatus for separating gas and liquid of claim 6, further comprising:
   a ring-shaped sealing member inserted into the housing to contact and support the main body or the extension and having an orifice formed in a central region thereof.

8. The apparatus for separating gas and liquid of claim 7, wherein the sealing member is formed by coupling at least two second unit members in a circumferential direction of the rotating shaft.

9. The apparatus for separating gas and liquid of claim 7, wherein the two adjacent second unit members are hinged to each other.

10. An apparatus for separating gas and liquid comprising:
    a housing;
    a rotating shaft provided inside the housing;
    a drive unit configured to rotate the rotating shaft;
    a rotating cone mounted at the rotating shaft to rotate about the rotating shaft and having a diameter decreasing from an upper end to a lower end thereof;
    a fixed cone disposed spaced apart from the rotating cone, and including a main body formed to have a diameter decreasing from an upper end to a lower end thereof and an extension extending downward from the main body; and
    a sealing member inserted into the housing to support the fixed cone and having a larger diameter than the maximum diameter of the fixed cone,
    wherein the sealing member is a ring-shaped washer having an orifice formed in a central region thereof.

11. The apparatus for separating gas and liquid of claim 10, wherein the washer has a larger outer diameter than the maximum diameter of the fixed cone.

12. The apparatus for separating gas and liquid of claim 10, wherein the sealing member is formed by coupling at least two second unit members in a circumferential direction of the rotating shaft.

13. The apparatus for separating gas and liquid of claim 12, wherein the sealing member is formed by coupling lateral ends of the two adjacent second unit members so that at least portions of the lateral ends of the two adjacent second unit members overlap each other.

14. The apparatus for separating gas and liquid of claim 13, wherein a third stepped portion is provided in a lateral end of one of the two adjacent second unit members, and a fourth stepped portion formed in a direction opposite to the third stepped portion is provided at a lateral end of the other first unit member, and
    a second protrusion is formed at the third stepped portion, and a second groove portion recessed to insert the second protrusion is formed at the fourth stepped portion.

15. The apparatus for separating gas and liquid of claim 12, wherein the two adjacent second unit members are hinged to each other.

* * * * *